United States Patent [19]
Saucier

[11] Patent Number: 5,308,215
[45] Date of Patent: May 3, 1994

[54] PASSENGER LIFT MOVABLE AT VARIABLE SPEEDS

[75] Inventor: Stanton D. Saucier, Tarzana, Calif.

[73] Assignee: Ricon Corporation, Pacoima, Calif.

[21] Appl. No.: 920,796

[22] Filed: Jul. 28, 1992

[51] Int. Cl.$^5$ .............................................. B60P 1/44
[52] U.S. Cl. ................................... 414/546; 91/31; 91/32; 91/533; 414/917; 414/921
[58] Field of Search ........ 414/546, 917, 921, 556–558; 91/31, 32, 533, 459

[56] References Cited

U.S. PATENT DOCUMENTS

| | | | |
|---|---|---|---|
| 2,470,778 | 5/1949 | Lankovski et al. | 414/546 |
| 3,415,161 | 12/1968 | Mindran | 91/32 X |
| 4,400,938 | 8/1983 | Ohe | 91/31 X |
| 4,715,264 | 12/1987 | Stoll | 91/31 X |
| 4,783,043 | 11/1988 | Koerber | 91/31 X |
| 4,808,056 | 2/1989 | Oshima | 414/921 X |
| 4,821,622 | 4/1989 | Burk | 91/31 X |
| 4,917,001 | 4/1990 | Yoshikawa et al. | 91/31 X |
| 5,110,252 | 5/1992 | Aoki | 414/921 X |
| 5,142,963 | 9/1992 | Piekutowski | 91/31 |

*Primary Examiner*—David A. Bucci

[57] ABSTRACT

A hydraulic drive passenger lift with distinct lifting "up and down" (loading, unloading) and "fold-unfold" (storage) motion patterns, includes a flow control structure that accommodates various hydraulic flows, somewhat unrestricted for "up-and-down" movement, and different for "fold" and "unfold" movements. The flow control structure includes multiple paths between a source and an actuator, with control for selecting the appropriate path to yield predetermined flow rates. A solenoid driven spool valve and a biased movable orifice member select the desired path. Accordingly, while the flow is substantially unrestricted during "up-and-down" movement, it is somewhat restricted for reduced speed during the "unfold" movement and is more restricted during the power-driven "fold" movement.

10 Claims, 3 Drawing Sheets

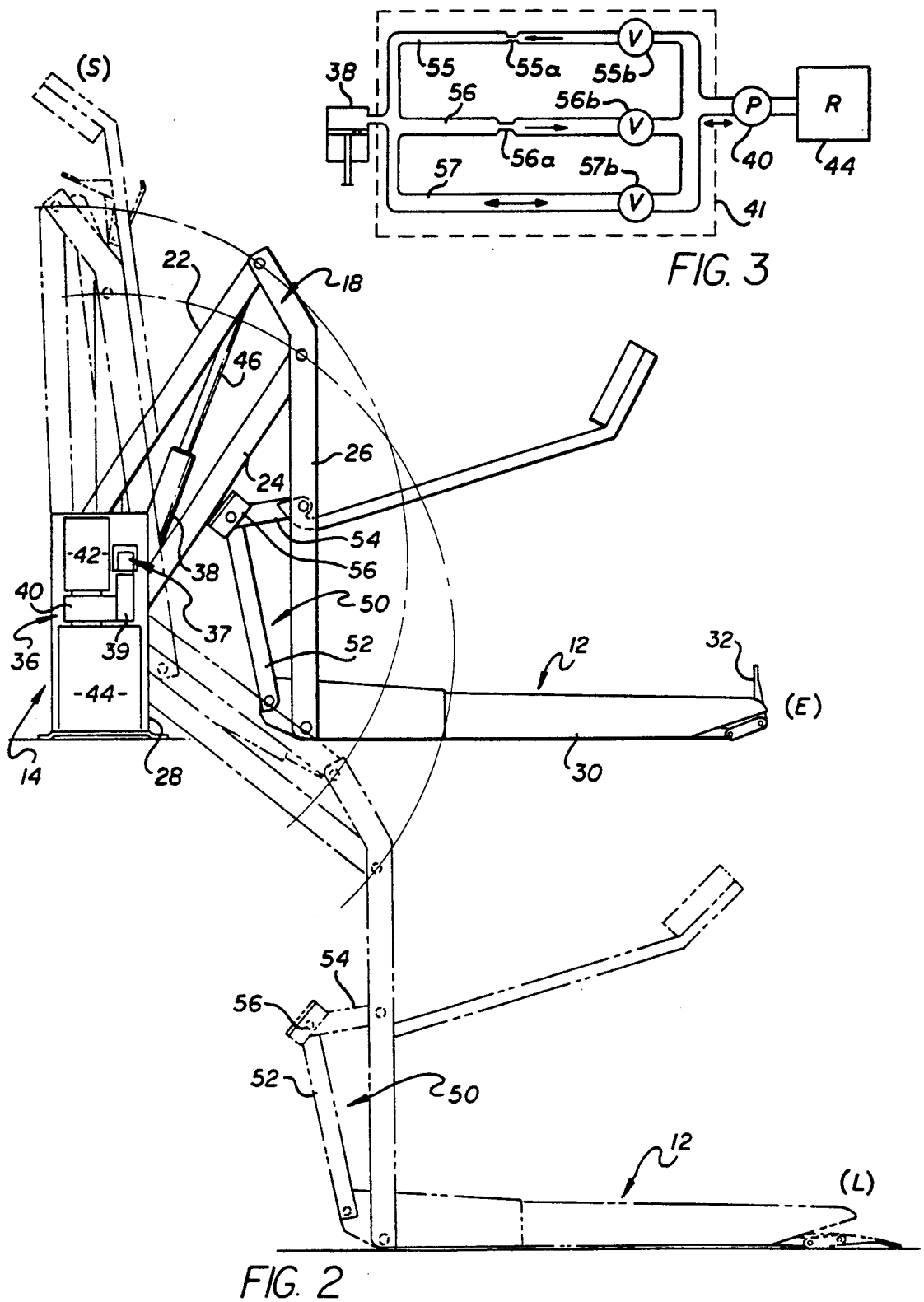

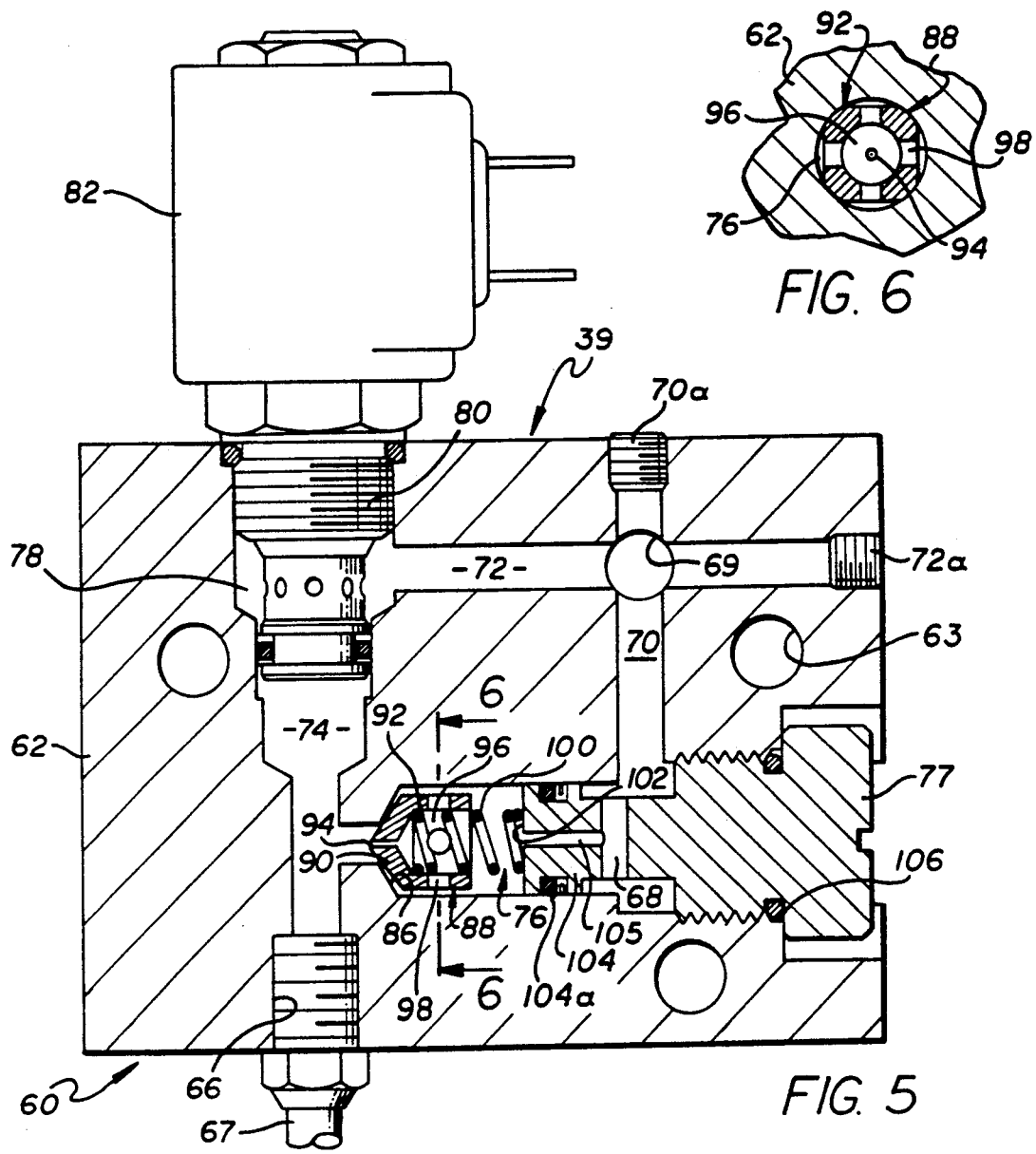
FIG. 6
FIG. 5
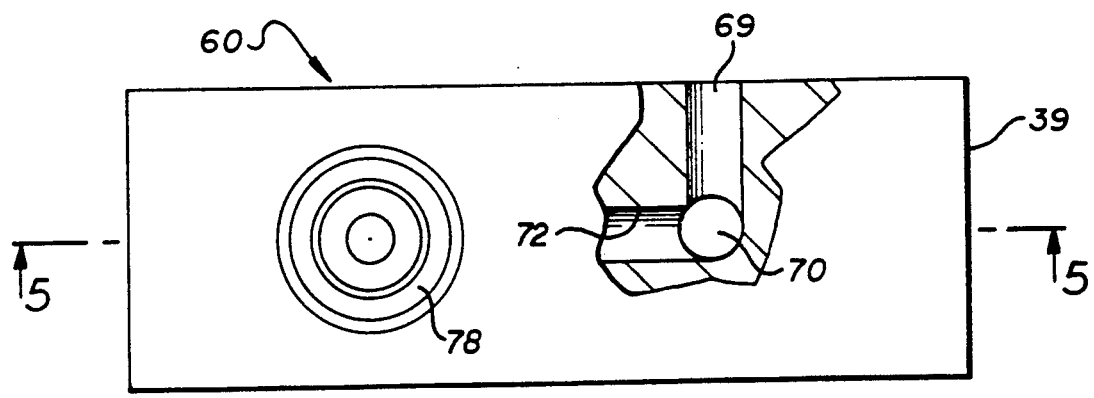
FIG. 4

PASSENGER LIFT MOVABLE AT VARIABLE SPEEDS

BACKGROUND OF THE INVENTION

1. Field of the Invention

This invention relates to passenger lifts and, in particular, it relates to an improved, hydraulically driven passenger lift with controlled movement during loading and storage operations.

2. Discussion of the Prior Art

An increasing sensitivity exists in our society for the mobility of people who have difficulty walking. Although various forms of wheelchairs have helped considerably, their users face many obstacles, as getting in and out of vehicles such as vans and buses. Consequently, there is a great need for improved passenger lifts having mobile platforms to raise and lower passengers effectively between a loading position, at ground level, and an entry position that is aligned with the vehicle's floor.

The convenience of passenger lifts is enhanced, if the platform folds or collapses for storage inside the vehicle. The speeds at which passenger lifts operate while moving through raising, lowering, stowing and deploying patterns gives rise to certain safety considerations. Based on such safety considerations, the Americans with Disabilities Act, 42 U.S.C. Sec. 1201 et seq., establishes a different limit on the speed at which wheelchair lift platforms can be raised or lowered, than the speed at which they can be deployed or stowed. Section 38.23(b)(10), Federal Register, Vol. 56, No. 173, p. 54757 provides that no part of the platforms shall move at a rate exceeding six inches/second while raising and lowering an occupant and shall not exceed twelve inches/second while deploying and stowing, unless the platforms are manually deployed or stowed. However, if swing motions are involved in deploying and storing platforms, further speed restrictions may be prudent. Typically, the raising and lowering or "up and down" operations must have the capability to operate with a substantial load, i.e. a person in a wheelchair. Conversely, the deploying and stowing operations involve only the weight of the lift.

U.S. Pat. No. 4,534,450 discloses a hydraulically driven passenger lift movable through loading, entry and storage patterns. The stated advantage of the hydraulic system of that patent is that the same pump raises the platform and powers its motions. The use of a single pump simplifies the system, thereby decreasing both the system's weight and cost while increasing the system's reliability.

However, a drawback of the hydraulic system of U.S. Pat. No. 4,534,450 is the difficulty of moving the platform at different speeds as it is stowed, deployed, raised and lowered. Consequently, a need exists for an economical, trouble-free, safe and convenient hydraulic lift with a flow control to move the lift platform at different speeds through patterns of deploying, loading and stowing.

Note that effective control of the platform speed as it is stowed and deployed may be particularly difficult due to load and power differences that occur. For example, the problem may be complicated by pressure differences occurring as the lift moves through different patterns. Consequently, there is a need for a hydraulic drive system for a passenger lift with a directionally dependent flow controlling device that is activated depending on the pattern of operation of the lift. Such a device would permit the lift platform to move at different speeds through different motion patterns.

SUMMARY OF THE INVENTION

In accordance with the invention, a hydraulic drive system actuates a passenger lift in relation to a vehicle in phases of different motion patterns. A hydraulic actuator is coupled to the passenger lift for lifting phases of the patterns. A source means supplies and receives hydraulic fluid, and a flow control means regulates flow rates for the desired motion phases of the different patterns.

In the flow control structure, multiple fluid paths connect the source to the actuator structure. Different paths invoke predetermined flow rates. A spool valve, selects one of two fluid paths. Additionally, a directional flow restrictor limits the flow through one of the paths in one direction.

BRIEF DESCRIPTION OF THE DRAWINGS

FIG. 2 is a side elevational view of a portion of the lift shown in FIG. 1 illustrating different positions of the lift.

FIG. 3 is a hydraulic circuit diagram of the system embodied in the passenger lift of FIG. 1;

FIG. 4 is a top plan view, partially cut away, of the flow control valve body embodied in the lift of FIG. 1;

FIG. 5 is a cross-sectional view taken along line 5—5 of FIG. 4; and

FIG. 6 is a sectional view taken along line 6—6 of FIG. 5.

DETAILED DESCRIPTION OF THE PREFERRED EMBODIMENTS

Figure 1:
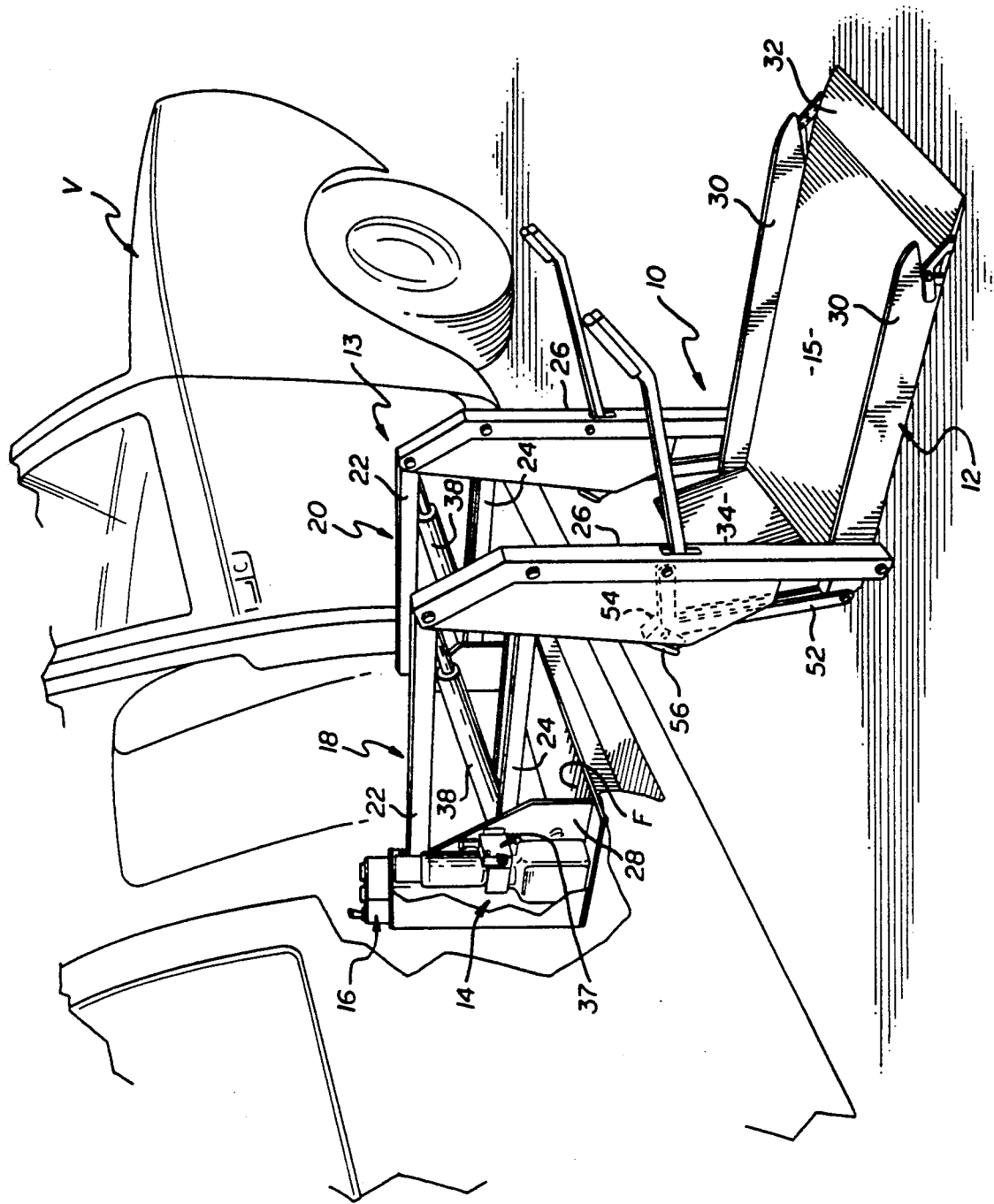
FIG. 1 is a perspective view of a portion of a vehicle carrying a passenger lift in accordance with the present invention.

As required, a detailed illustrative embodiment of the invention is disclosed. However, it is to be understood that the invention is not limited in its application to the details of construction and arrangement of parts illustrated in the accompanying drawings and description, since the invention is capable of other embodiments and of being practiced or carried out in various ways. For example, while the invention is illustrated by a hydraulic system using a pair of hydraulic cylinders, it is equally adaptable to a hydraulic system using a single cylinder. Similarly, while the invention is illustrated by a lift adapted to transport a passenger in a wheelchair, it is equally suitable for transporting passengers using other mobility devices or passengers on foot. Also, it is to be understood that the phraseology or terminology employed herein is for description and not of limitation.

Referring to FIG. 1, a portion of a vehicle V is shown carrying a lift 10 for raising a passenger in a wheelchair (not shown) to a position for entering and leaving the vehicle. The passenger lift 10 is fastened to the bed or floor F of the vehicle V. Structurally, the lift 10 incorporates a mobile platform 12 (lower right) for receiving a load, a hydraulic system 14 (upper left) for driving the platform, a platform mechanism 13 and a control unit 16 for actuating the platform through different motion patterns. The platform 12 is accommodated by the platform mechanism 13 to move in two different motion patterns, i.e. a passenger transporting, horizontal pattern with raise and lower phases, and a storage motion pattern with store (swing up) and deploy (swing down) phases.

The platform 12 defines a flat and rigid, generally rectangular lift surface 15 pivotally connected to the vehicle V by the mechanism 13 including a pair of spaced apart armatures 18 and 20, each including upper and lower parallel links 22 and 24, respectively (shown horizontally aligned in FIG. 1) and each connected to a vertical link 26 of substantial width. Each of the parallel links 22 and 24 is pivotally secured at an outboard end (remote from the vehicle V) to one of the vertical links 26 and at an inboard end to the inside of an armature bracket 28.

The lift 10 incorporates various structural safety features. Specifically, elongated side risers or guide rails 30 (lower right) are fixed on each side of the platform 12. At the outboard or front end of the platform 12, a pivotal end flap 32 is fixed adjacent the surface 15. As best seen in FIG. 2, during loading of the platform, the flap 32 rotates from a horizontal ramp position to an upright barrier position. In addition, an inboard ramp 34 (FIG. 1) bridges the gap between the platform 12 and the vehicle floor when the platform is horizontal and level with the vehicle floor F. The ramp 34 also serves as a barrier as the platform 12 is raised and lowered.

In FIG. 2, the passenger lift 10 is illustrated in two positions as driven by the hydraulic drive system 14 (FIG. 1). Structurally, the hydraulic drive system 14 includes hydraulic actuators 38 coupled to the mechanism 13 for controlling the lift through different patterns.

A pair of spaced apart cylinders 38, each with an axially aligned piston rod 46 provide hydraulic actuators extending to the outboard ends of the mechanism 13. That is, remote from the cylinder 38, each piston rod 46 is pivotally connected to one of the armatures 18 and 20 at the point of connection of an upper parallel link 22 to a vertical link 26. The opposed end of each cylinder 38 is pivotally connected to the point of connection of a lower parallel link 24 of an armature bracket 28.

The hydraulic system 14 includes a pump assembly 36 (FIG. 2) and is affixed to the outside of the rear armature bracket 28 for support. A suitable pump assembly 36 is the Monarch M-259 manufactured by Fluid-Pack, International Ltd., London, Ontario. The assembly 36 includes a pump 40 to actuate the cylinders 38, a motor 42 to power the pump and a reservoir 44 to supply and accept fluid to and from the hydraulic drive system 14. Fluid passages (not shown in FIG. 2) accommodate fluid flow between the assembly 36 and the cylinders 38 in forward and reverse directions. Note that the lift is raised under power but lowers under the force of its own weight.

Turning now more specifically to the operation of the passenger lift, the platform 12 moves between a lower, loading position L (FIG. 2, dashed line) outside the vehicle V and a raised, entry position E (solid line) level with the floor of the vehicle. From the entry position, the platform 12 moves to a storage position S (dashed line) inside the vehicle. Note that in the loading position L, the piston rods 46 are compressed and the platform 12 lies in a horizontal plane at ground level. In this position a wheelchair can be rolled conveniently onto the platform 12.

To raise the platform 12 from the loading position L to the entry position E, a lift operator manually selects the "raise" pattern using the control unit 16. As a result, the hydraulic system 14 forces the cylinder rods 46 to extend, causing the armatures 18 and 20 to pivot upwardly until the platform 12 lies in a horizontal plane level with the floor of the vehicle. Note that the deformable parallelograms (formed by each of the armatures 18 and 20 with its bracket 28) maintain the platform 12 in a substantially horizontal position as it is raised or lowered between the ground and the floor of the vehicle.

In addition to the passenger raising and lowering motion patterns, the lift operator may manually select a "stow" pattern using the control unit 16. As a result, the hydraulic system 14 actuates the rods 46 to move between the positions S and E.

As best seen in FIG. 2, the platform 12 is moved between the horizontal plane of position E and the vertical plane of position S by means of a pair of four bar linkages 50 associated with each armature 18 and 20. Each linkage 50 is formed by the lower end of the vertical link 26, the rear end of the platform 12 and pivot bars 52 and 54. A contact pad 56 is pivotally connected to the four bar linkage 50 at the connection between the two pivot bars 52 and 54. The lengths of the pivot bars 52 and 54 are such that the contact pad 56 abuts the lower parallel link 24 when the platform 12 is at a point just above the entry position. With further extension of the rod 46, the pivot bar 52 is forced downward, forcing the platform into the substantially vertical position S.

Considering the reverse motion patterns, when a wheelchair passenger wishes to get out of the vehicle V, the operator chooses the "deploy" pattern using the control unit 16. This actuates the hydraulic system 14 to open a valve (disclosed below) allowing the platform 12 to move from the substantially vertical position S to the horizontal entry position E. The wheelchair is rolled onto the platform 12, and upon the operator's selecting the "lower" motion pattern, the platform eases to the position L. After the wheelchair is off the platform 12, the power phases are repeated, returning the platform under power to the storage position S.

Recapitulating to some extent, the lift has four distinct motion phases of two patterns (storage and transport) as set out below. For each phase, there is a different hydraulic mode.

| Pattern Phases | Movement | Flow | Operation |
| --- | --- | --- | --- |
| Storage Pattern, deploy | S to E | To Reservoir | Swing from storage position |
| Transport Pattern, lower | E to L | To Reservoir | Horizontal movement to ground |
| Transport pattern, raise | L to E | To Cylinder (Power) | Horizontal movement to vehicle |
| Storage pattern, store | E to s | To Cylinder (Power) | Swing to storage position |

Turning now to the hydraulics, control of the speed at which the passenger lift moves through the different patterns resides in a valve body 39 (FIG. 2) which is part of the pump assembly 36. In the disclosed embodiment, a lightweight unitary aluminum block is machined to define multiple passageways and receive control members. However, FIG. 3 illustrates the hydraulic circuit using standard symbology. Essentially, a hydraulic control 41 represents a unitary block body that is coupled between the cylinders 38 (FIGS. 2 and 3) and the pump 40 which is in turn connected to the reservoir 44. The pump 40 is active during pattern phases to store and transport the lift.

The control 41 defines three passages, represented in FIG. 3 by passages 55, 56 and 57. The passage 55 defines an orifice 55a and contains a valve 55b. Similarly, the passage 56 defines an orifice 56a and contains a valve 56b. The passage 57 is unobstructed but carries a valve 57b. The functions of the passages are summarized as follows:

| Passage | Flow | Operation (Valve Open) | Function |
|---|---|---|---|
| 55 | Left | Movement E to S (store) | Present small orifice |
| 56 | Right | Movement S to E (deploy) | Present large orifice |
| 57 | Bidirectional | Movement L to E (raise) and E to L (lower) | Accommodate lifting and lowering operation without |

The restricted passages 55 and 56 effect lift movement at similar reduced speeds, the orifice sizes compensating for the weight of the lift accounting for movement during "deploy" while the pump drives the lift during "store".

Reference will now be made to FIGS. 4 and 5 to consider the composite integrated structure of the control 39 in a block or body. Note that the body 39 is affixed to the pump assembly 36 by machine screws (not shown) extending through bores 63 (FIG. 5).

Essentially, the block or valve body 39 accommodates fluid flow in multiple paths as described above to enable the lift to move at select speeds.

Considering the structure of the block 39 (FIG. 5) in greater detail, a staged bore 74 extends through the block 39 from top to bottom. The top portion of the staged bore 74 forms a cavity 78 configured to receive a normally closed spool valve 80 actuated by a solenoid 82.

Transverse to the bore 74, a bore 72 extends from cavity 78 to the right-hand side of the block 39 as shown. A plug 72a seals the end of the bore 72 opposite the cavity 78.

Below the bore 72 and also transverse to the bore 74, a staged bore 76 extends from a region proximate the lower end of bore 74 to the right-hand side of block 39. The orifice of the bore 74 is closed by a threaded plug 77 sealed by an "O" ring 106. The stage of bore 76, proximate to the end that connects with bore 74, forms a tapered seat 86 for a normally seated movable member or orifice 88. The movable unidirectional flow, attenuating orifice 88 has a tapered section 90 to abut the seat 86 seated (left).

Referring now additionally to FIG. 6, the movable orifice 88 includes a substantially square body section 92. The diagonal of the body section 92 is smaller than the diameter of the bore 76 permitting the movable orifice 88 to shift freely within the bore. The tapered section 90 defines a relatively small orifice 94 while the body section 92 has a flow passage 96 therethrough and lateral perforations 98 through each of its four sides. Accordingly, the flow passage 96 is in fluid connection with the gaps formed between the sides of the body section 92 and the adjacent surface of the bore 76.

The movable orifice 88 (FIG. 5) is biased against the seat 86 by a spring 100. One end of the spring 100 is recessed in the flow passage 96. The other end of the spring 100 abuts a contact surface 102 of a cartridge 104 set in the bore 76. An O-ring 104A seals the cartridge 104 in the bore 76.

A relatively large orifice 105 through the portion of the cartridge proximate the contact surface, intersects with a transverse bore 68 and together they connect the bore 76 to bore 70. The relatively small orifice 94 in movable orifice 88 has a diameter that is smaller than the relatively large orifice 105 in the cartridge 104. These orifices coincide to the representative orifices 55a and 56a, respectively, of FIG. 3.

The bore 70, disposed parallel bore 74, extends from the top of block 39, intersects the bore 72 and terminates in the mid-portion of a bore 76 connecting the bores 72 and 76. A plug 70a seals the entry of the bore 70 opposite the bore 76. A bore 69 (coupled to the pump 40) lies orthogonal to the plane formed by the bores 70 and 72. The bore 69 extends from the intersection of bores 70 and 72 to the surface of the block 39.

Threads on the surface of the lower end of bore 74, form a cylinder port 66 that threadably couples with a cylinder line 67 to connect the block 39 with the cylinders 38. As indicated above, the surface of the end of the bore 69 (opposite the intersection with the bores 70 and 72) connects the block 39 to the pump assembly 36.

Turning now to the operation of the flow control means, one fluid path is from the pump port 69 through the bores 72 and 74, then to the cylinder port 66. The path accommodates flow to raise and lower the platform between positions L and E. It is represented by the passage 57 in FIG. 3.

A second fluid path is from the pump port 69 through bores 70, 76, and a portion of the bore 74 to the cylinder port 66. The path accommodates flow attendant movement between the positions E and S. The path is represented in FIG. 3 by the two paths 55 and 56 passing fluid in two directions, one more restricted than the other. As indicated above, the stowing pattern is powered and consequently flow is more restricted to accomplish the desired speed of motion.

To summarize, consider the distinct motion patterns of deploying the lift 10, raising and lowering (with or without a passenger) and storing the lift. For deployment, the spool valve 80 is closed. The fluid is subjected to relatively smaller pressure as it travels (left to right) from the cylinder port 66 to the pump port 69 forced by the weight of the lift 10. As the fluid enters the bore 76, the movable orifice 88 is unseated, permitting the fluid to pass around and through the movable orifice without substantial obstruction. However, the fluid does encounter the relatively large control orifice 105 for some reduced flow.

When the platform 12 is to be stored or stowed, the spool valve 80 is closed. However, by action of the pump 40, the fluid is subjected to relatively greater pressure as it travels in the direction from the pump port 69 to cylinder port 66. The fluid flows through the bore 70 into the transverse bore 68 and then through the relatively large orifice 105 causing some reduction in the flow rate. then, the fluid encounters the movable orifice 86 in its seated position so that flow is substantially obstructed to accomplish the desired rate and motion speed as fluid emerges into the bore 74 and passes to the cylinders.

It is to be noted that the orifice sizes are selected so that final flow rates, and consequently the rates of platform movement during both deployment and storage are substantially equal. The operation requires that the effective orifice encountered by the fluid subjected to the higher pressure difference (during storage) be smaller than the effective orifice encountered by the fluid subjected to the lower pressure difference (during deployment).

Because of the above described flow control means, the passenger lifts in accordance with the invention possess a combination of efficiency and safety not possessed by other lifts. With the passenger lifts in accordance with the invention, a single pump and integrated control unit can stow and deploy the lift platform at slow speeds, while raising and lowering the lift platform at significantly faster speeds.

What is claimed is:

1. A multiple motion-pattern hydraulic lift as for moving passengers in relation to a vehicle, said lift comprising:
   a platform mechanism structure for carrying a passenger and adapted to be affixed to said vehicle for movement through phases of distinct storage and passenger bearing motion patterns, said platform mechanism structure adapted to lie in a substantially horizontal plane and move along a substantially vertical plane through said passenger bearing motion pattern, between a lower position outside said vehicle and a raised position substantially level with a floor of said vehicle, said platform mechanism further adapted to swing from said raised position through swing up and swing down phases of said storage motion pattern;
   hydraulic apparatus connected to said platform mechanism structure for actuating said platform mechanism structure; and
   a hydraulic flow control structure connected in a circuit with said hydraulic apparatus to control said motion patterns and including, passage structure defining a plurality of passages, valve means for controlling flow in said passages, and a moving orifice member in at least one of said passages for attenuating flow in one direction through said one passage during at least said swing up phase of said storage motion pattern.

2. A system according to claim 1 wherein said valve means selects at least one of said passages in said plurality of passages to control flow when said platform mechanism moves through lowering and raising phases of said passenger bearing motion pattern.

3. A system according to claim 1 wherein said hydraulic flow control structure includes a unitary block defining said passages.

4. A system according to claim 1 wherein said valve control means in said hydraulic flow control structure is a solenoid valve.

5. A system according to claim 1 wherein said platform mechanism structure includes a platform and a mounting structure to urge said platform through raising and lowering phases of said passenger bearing motion pattern and through said swing up phase and a swing down phase of said storage motion pattern.

6. A system according to claim 5 wherein said one passage containing said moving orifice member is connected to accommodate the fluid flow attendant when said platform mechanism moves through said swing down phase.

7. A system according to claim 5 wherein said hydraulic apparatus activates said platform mechanism structure only through said raising phase of said passenger bearing motion pattern and said swing up phase of said storage motion pattern.

8. A system according to claim 1 wherein said hydraulic apparatus includes at least one hydraulic cylinder/rod actuator and a source of actuating hydraulic fluid.

9. A system according to claim 8 wherein said valve means selects at least one of said passages in said plurality of said passages to control flow between said hydraulic cylinder/rod actuator and said source during lowering and raising phases of said passenger bearing motion pattern.

10. A system according to claim 6 wherein the rate of fluid flow when said platform mechanism moves through said swing down phase is different from said rate of fluid flow when said platform mechanism moves through said swing up phase.

* * * * *